United States Patent
Lehnhoff

(12) 
(10) Patent No.: US 6,604,907 B1
(45) Date of Patent: Aug. 12, 2003

(54) INDIVIDUAL BLADE ADJUSTMENT FOR WIND TURBINES

(75) Inventor: Martin Lehnhoff, Breiholz (DE)

(73) Assignee: Aerodyn Engineering GmbH, Rendsburg (DE)

( * ) Notice: Subject to any disclaimer, the term of this patent is extended or adjusted under 35 U.S.C. 154(b) by 0 days.

(21) Appl. No.: 10/110,371

(22) PCT Filed: Oct. 11, 2000

(86) PCT No.: PCT/DE00/03574
§ 371 (c)(1),
(2), (4) Date: Apr. 11, 2002

(87) PCT Pub. No.: WO01/27471
PCT Pub. Date: Apr. 19, 2001

(30) Foreign Application Priority Data

Oct. 11, 1999 (DE) ......................................... 199 48 997

(51) Int. Cl.⁷ ............................................... F03D 7/02
(52) U.S. Cl. ...................................................... 416/156
(58) Field of Search ................................. 416/155, 156, 416/157 R

(56) References Cited

U.S. PATENT DOCUMENTS 4,348,155 A  * 9/1982  Barnes et al. ............... 416/158
4,348,156 A  * 9/1982  Andrews ..................... 416/158
4,540,341 A  * 9/1985  Wuhrer .................... 416/157 R
6,428,274 B1 * 8/2002  Hehenberger ............... 416/155

FOREIGN PATENT DOCUMENTS

| DE | 3110266 A | * | 2/1982 | |
| DE | 3110263 A | * | 3/1982 | |
| DE | 3110265 A | * | 3/1982 | |
| FR | 1553046 A | * | 1/1969 | |
| GB | 2071779 A | * | 9/1981 | ................. 416/156 |
| WO | WO-99/23384 | * | 5/1999 | |

* cited by examiner

Primary Examiner—Christopher Verdier
(74) Attorney, Agent, or Firm—Larson & Larson, P.A.; James E. Larson

(57) ABSTRACT

An individual blade adjustment system for wind turbines comprising two drive units which are joined to at least one movable rocker arm, substantially in the cutting plane of the blade connection and which forms a lever mechanism together with the rocker arm, wherein each drive unit produces a linear extension. The respective ends of the lever mechanism are provided with a force-transmitting link to the hub and an element on the blade to be adjusted through each pivot connection.

19 Claims, 7 Drawing Sheets

INDIVIDUAL BLADE ADJUSTMENT FOR WIND TURBINES

PRIOR APPLICATIONS

This application bases priority on International Application No. PCT/DE00/03574, filed Oct. 11, 2000, which bases priority on German Application No. DE 199 48 997.1, filed Oct. 11, 1999.

BACKGROUND OF THE INVENTION

1. Field of Invention

The invention relates to an individual blade adjustment system for wind turbines.

2. Description of the Prior Art

For regulating or controlling the generator power, modern wind turbines are often equipped with rotor blades angular adjustment systems. Besides the regulating or control function, the blade adjustment systems still have a safety brake function, in that the rotor blades are set to a large positive or negative angle and, consequently, the rotor produces a brake torque.

The blade angle adjustment systems hitherto known for large wind turbines can be subdivided into electrically and hydraulically operated systems. It is common to all the systems that the rotor blades are mounted at the connection point to the hub by means of an antifriction bearing.

Electrically operated systems generally comprise one geared motor per rotor blade and which by means of the pinion and toothed rim produces a torque at the blade root. The motor can be fixed to the rotor blade and can act in a toothed rim connected to the hub or can be fixed to the hub and act in a rotor blade-side toothed rim on the blade bearing. The electrical supply of the motors takes place by means of slip ring systems. If the slip ring system or the entire power supply fails, the motors are battery-supplied.

Hydraulically operated systems use hydraulic cylinders for blade angle adjustment purposes. In the case of a collective blade adjustment, a single hydraulic cylinder transfers the adjustment forces into the hub and by means of an adjustment mechanism to pivots on the rotor blade roots. Hydraulic individual blade adjustment systems have a hydraulic cylinder for each rotor blade and which acts directly on the rotor blade pivot. The hydraulic pressure is then transferred into the hub by a rotary transmission. If the rotary transmission fails, the hydraulic cylinders are supplied by pressure storage devices in the hub.

Such a hydraulic blade adjustment device is known from DE C2 31 10 263, which describes a hydraulic system which is secure in emergency situations and in which two servo-drives act on connecting members articulated by levers. However, the zero position synchronization is complicated. Moreover, to maintain the blade position, it is necessary to have additional mechanically operated locking elements.

In the simultaneously filed application of the same application DE C2 31 10 265, the details of a blade adjustment device are given and which keeps the blades at the same angle, but without preventing the separate operation thereof.

Reference is also made to DE A1 42 21 783, which describes a device for adjusting rotor blades, in which a gear arranged coaxially to the rotor hub with a motor, and by means of a toothed segment link brings about the adjustment of the blades.

Finally, DE A1 198 11 952 describes a method for fixing the rotor blades of a horizontal rotor wind power plant and to a device for performing the method, which is characterized by means for the permanent blocking of a predetermined adjustment angle range of the rotor blades about their longitudinal axis. Said means are formed by an outwardly projecting pawl.

The problem of the invention is to increase the reliability of a blade angle adjustment system. Reliability is essential for the safety of a wind turbine. Otherwise, uncontrollable states can arise where the rotor speed cannot be decelerated by the blade adjustment system.

Therefore, maximum significance is attached to the operational safety and security against failure of such a system. Electrical blade angle adjustment systems suffer from the fundamental disadvantage that in the case of a failure of the power supply, e.g. with a mains failure or cable break, the servomotors have to make do with a power storage device in battery form. They must firstly be switched over to the latter. Therefore, an electrical adjusting system, even in the case of a fault, is dependent on the operation of several electrical components which can be damaged by overvoltages from the mains or lightning strikes, which frequently correspond with power failures.

However, due to the size of the hydraulic cylinders and the geometrical conditions, the hitherto known hydraulic blade adjustment systems require openings in the bearing structure of the rotor hub. Such openings are obviously undesired, because on the one hand they reduce the dynamic loading capacity of the hub, and on the other make difficult or even impossible sealing against entering moisture or saline atmosphere, particularly in the case of offshore wind turbines. The use of an individual hydraulic cylinder for the precise setting of the blade angle, and simultaneously for adjusting large angles in the case of disconnection give rise to compromises in its design to the disadvantage of the setting precision.

SUMMARY OF THE INVENTION

This problem is solved according to the invention by the features of the main claim. The subclaims provide advantageous embodiments of the invention.

It is, in particular, advantageous that for improving the regulatability and for reducing the dimensions of a hydraulic blade adjusting system, the regulating and disconnection functions can be separated from one another. A regulating cylinder adjusts the rotor blade only in the angular range necessary for power or speed regulation, whereas, a disconnection cylinder moves the regulating cylinder by means of an adjustment mechanism into the regulating or disconnection position.

In this configuration, the design of the regulating cylinder can be based solely on the regulating function. The shorter travel of the regulating cylinder also leads to a much higher resolution of the necessary path measuring system.

The disconnection cylinder can be designed in an optimum manner for the adjustment function with respect to the adjustment force and speed without having to take account of regulatability.

Another essential advantage of the system is the reduction of the overall dimensions. Through the use of two cylinders, whose arrangement is determined by the geometry of an adjusting linkage, the system can be completely located within the hub so that the latter can be completely enclosed or ventilated in a controlled manner.

In addition, the hub structure can be designed for an optimum force flux because there is no need for openings for the adjustment system.

DESCRIPTION OF THE DRAWINGS

Further features and advantages of the invention can be gathered from the following description of a preferred embodiment with reference to the attached drawings, wherein.

DETAILED DESCRIPTION OF THE PREFERRED EMBODIMENT

Figure 1:
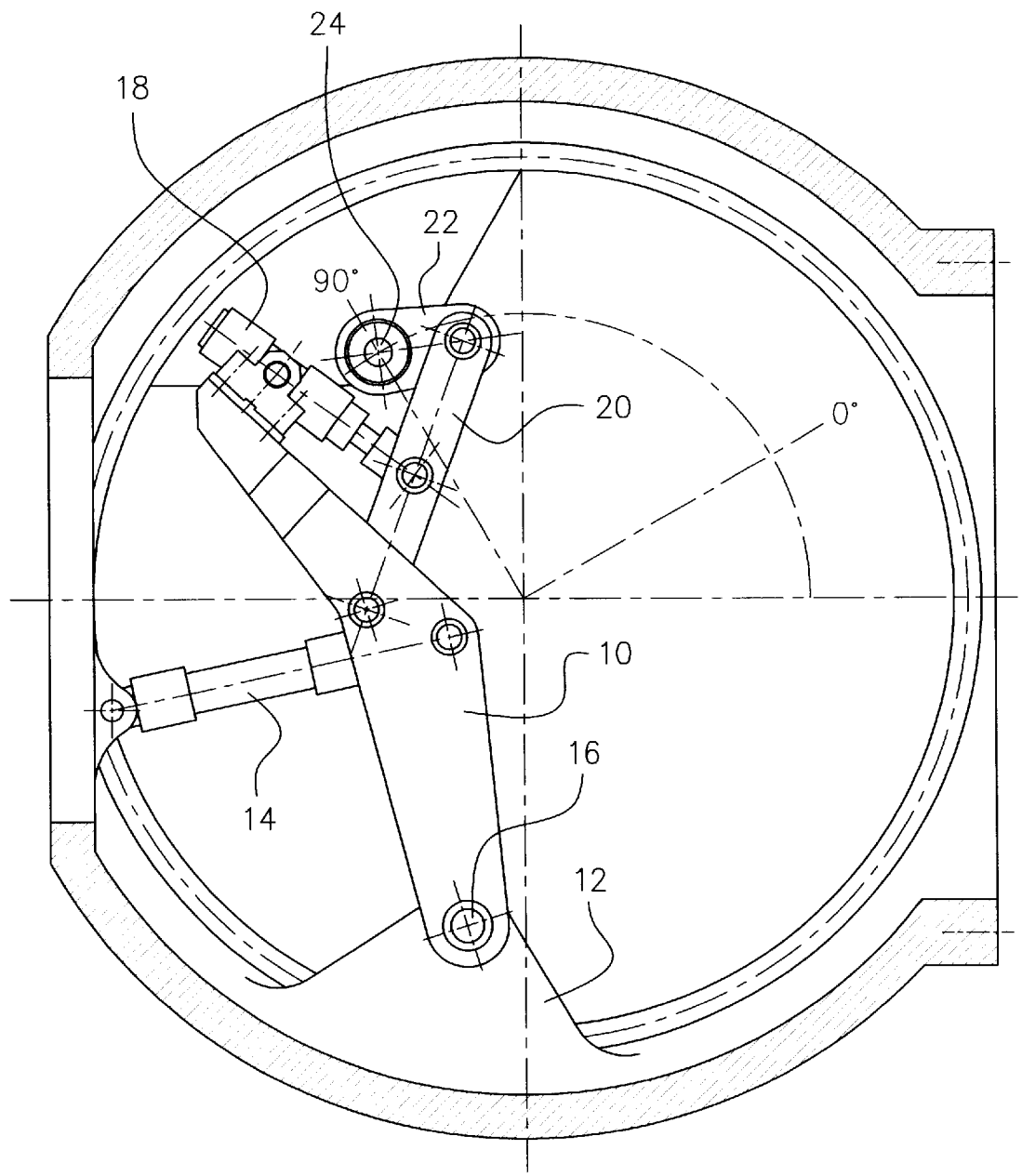
FIG. 1 shows the system in the disconnection position, i.e., with a blade angle of 90°.
Figure 2:
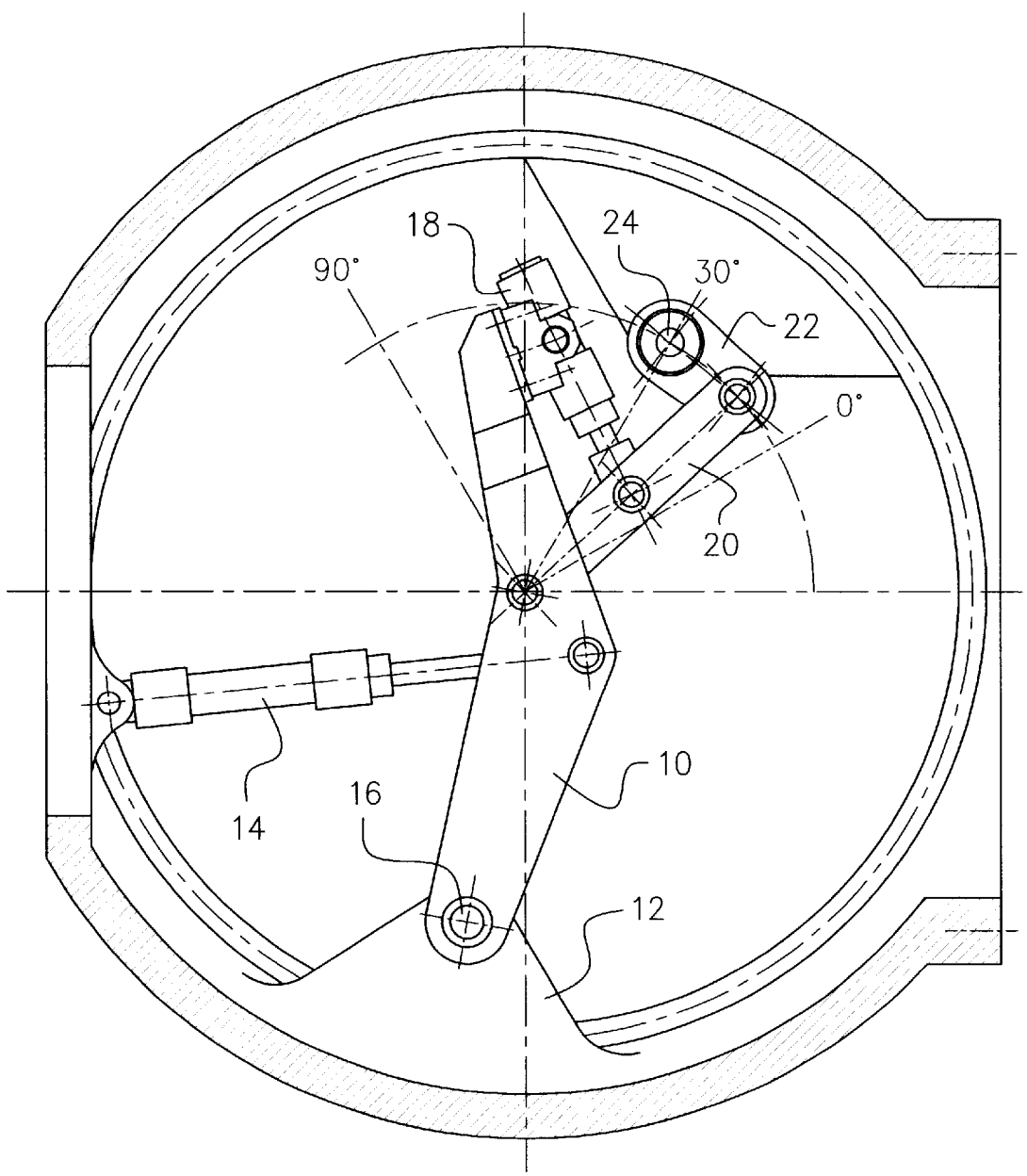
FIG. 2 shows the main rocker arm in the operating position, e.g. with a blade angle of 30°.
Figure 3:
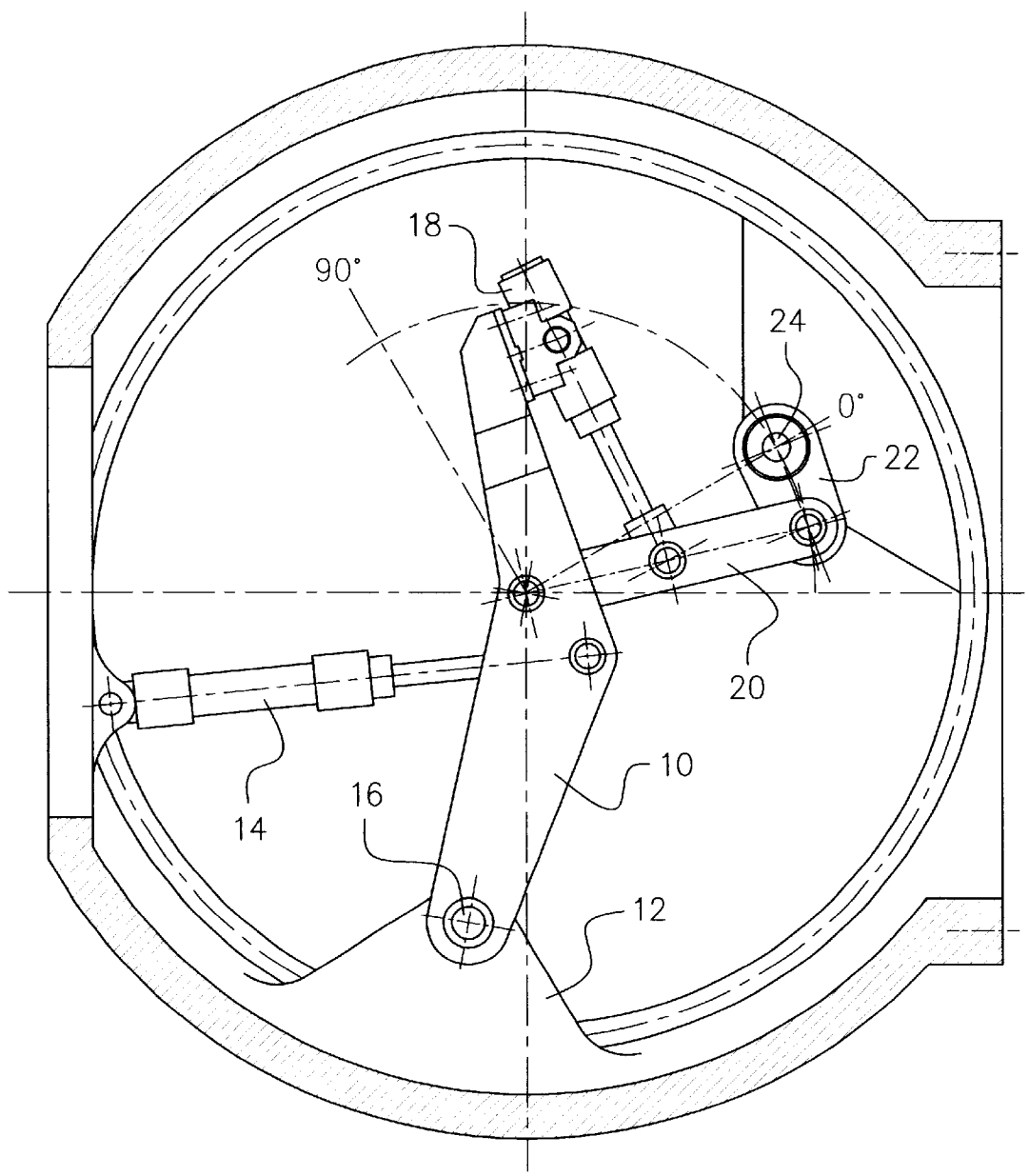
FIG. 3 shows the blade rocker arm with fully extended regulating cylinder for a blade angle of approximately 0°.

In the case of the blade adjustment system shown in FIG. 1, a main rocker arm 10 is fixed to a hub-side projection 12 and is pivotably held about its articulation point or fulcrum 16 by means of a disconnection cylinder 14, which is also fixed to the rotor hub at an angle to the main rocker arm 10 (as is shown in comparison with FIG. 2), through the extension of the disconnection cylinder 14, the main rocker arm 10 can be pivoted over a greater angle.

At the end of the main rocker arm 10 and substantially parallel to a slightly angled portion of the said rocker arm 10, is provided a regulating cylinder 18 fixed to said rocker arm, and which acts on a blade rocker arm 20, which is once again pivotably attached in a central area of the main rocker arm 10 close to the area where the disconnection cylinder 14 acts on the main rocker arm.

By means of a coupling rod 22 which is provided for compensating length differences, said blade rocker arm 20 with a blade pivot 24, is in turn pivotably connected to the blade to be adjusted. Now, by extending the regulating cylinder 18 and also the disconnection cylinder 14, blade adjustments can be made. In the case of a failure of one of the cylinders, at least part of the desired path can be covered through the operation of the other cylinder and, consequently, there can at least be a rough adjustment to the desired blade angle.

For obtaining the result desired according to the invention, the individual blade adjustment system can have two drives 14, 18 attached to a rocker arm arranged substantially in the intersecting plane of the blade connection, and producing a linear extension, one end of the rocker arm being provided by in each case, one pivot connection 16, 24 with a force-transmitting articulation to the hub and an element on the blade to be adjusted so that a lever gear is obtained.

For precision setting purposes and the blade disconnection procedure, two different extension-producing linear drives are provided. One can be constructed as an electric spindle drive which is in particular proposed for the short stroke variable speed drive. However, both linear drives can also be constructed as hydraulic cylinders 14, 18.

The variant shown in the preceding drawings has the advantage that in the operating position the fulcrum in the blade rocker arm is located precisely on the rotor blade axis. In this arrangement, the blade pivots 24 and rocker arm move about the same axis during regulating processes. This and the geometrical arrangement of the regulating cylinder 18 permit both a virtually constant blade adjustment movement over the entire regulating range, and an exclusively tangential force introduction into the blade bolts.

Figure 4:
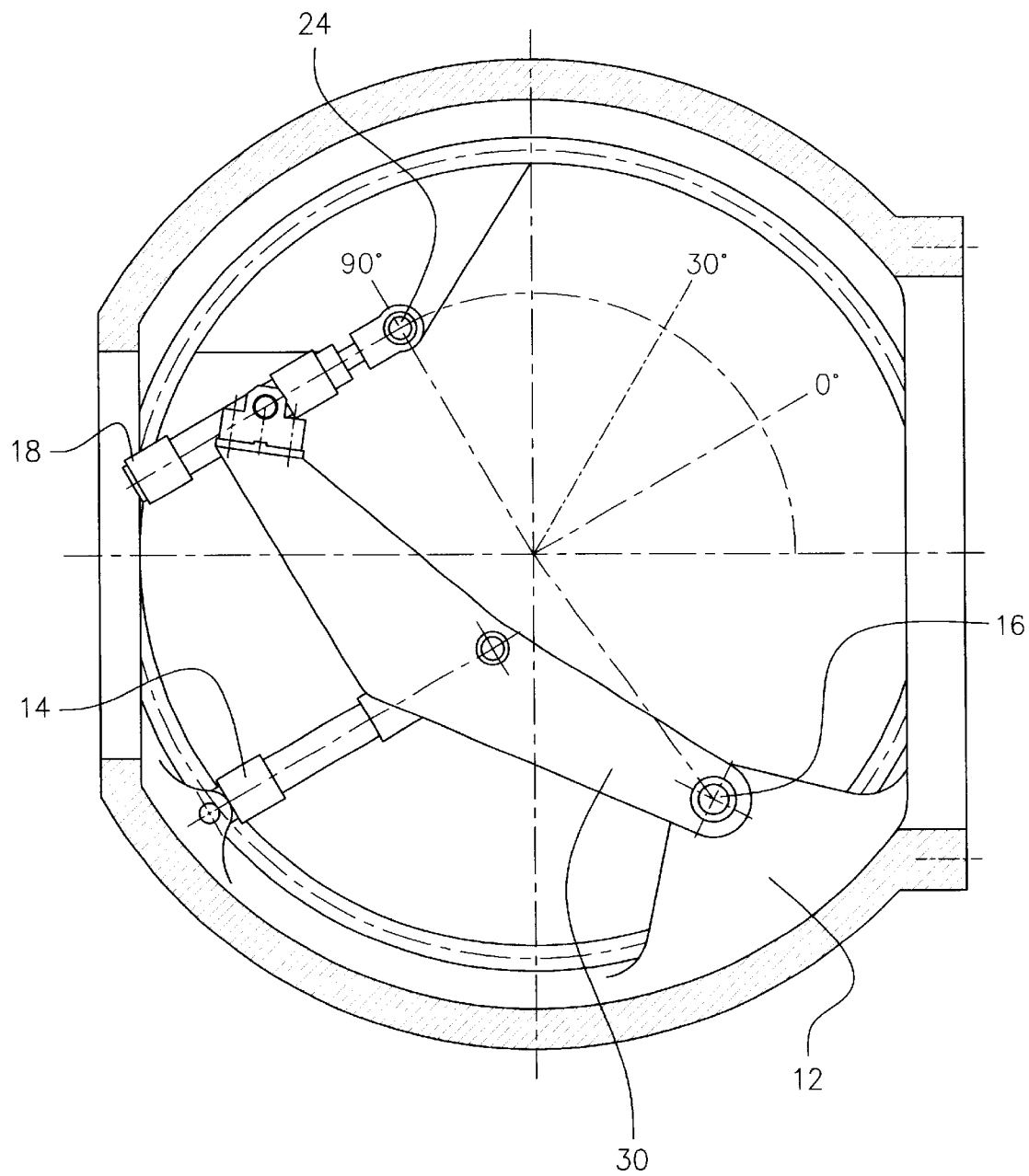
FIG. 4 shows the system in a second configuration in the disconnection position.
Figure 5:
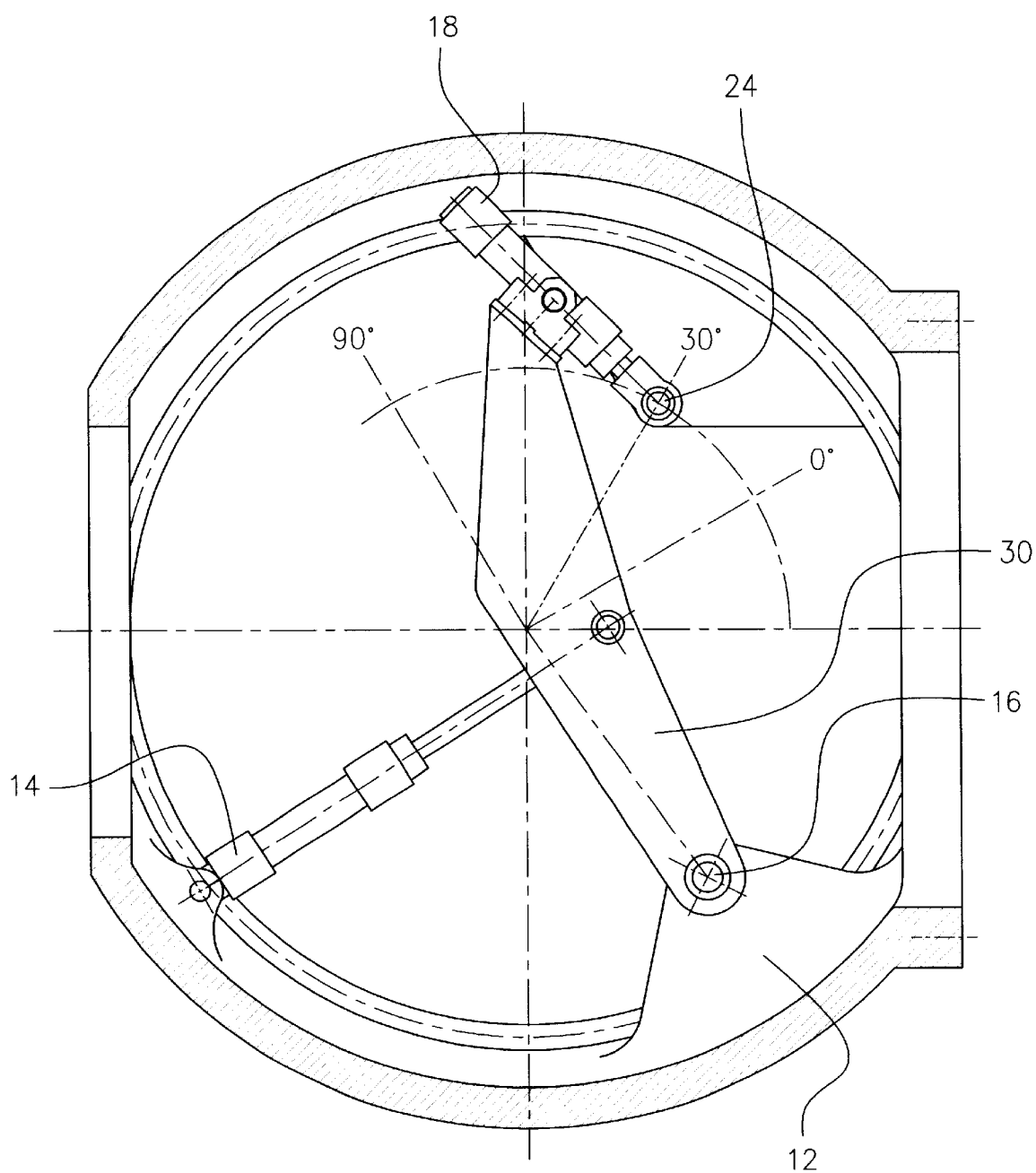
FIG. 5 shows the system of the configuration of FIG. 2 in an operating position, i.e. for the blade angle of 30°.
Figure 6:
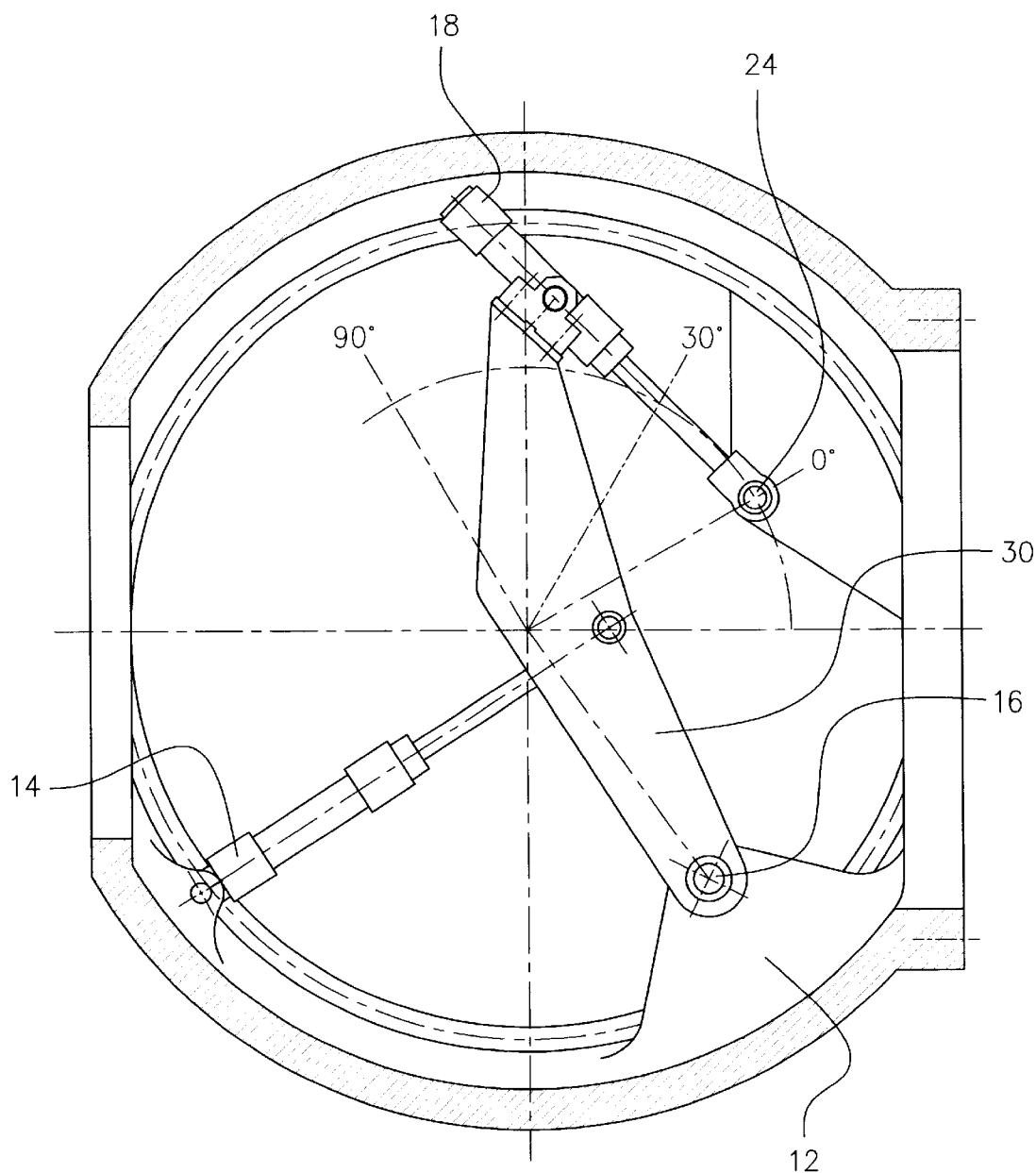
FIG. 6 shows the system of FIG. 5 with a completely extended regulating cylinder for a blade angle of approximately 0°.

The second variant, shown in FIGS. 4 to 6, has a single rocker arm 30, in which the regulating cylinder 18 directly operates the blade pivot 24 so that implementation is possible with reduced constructional expenditure.

Figure 7:
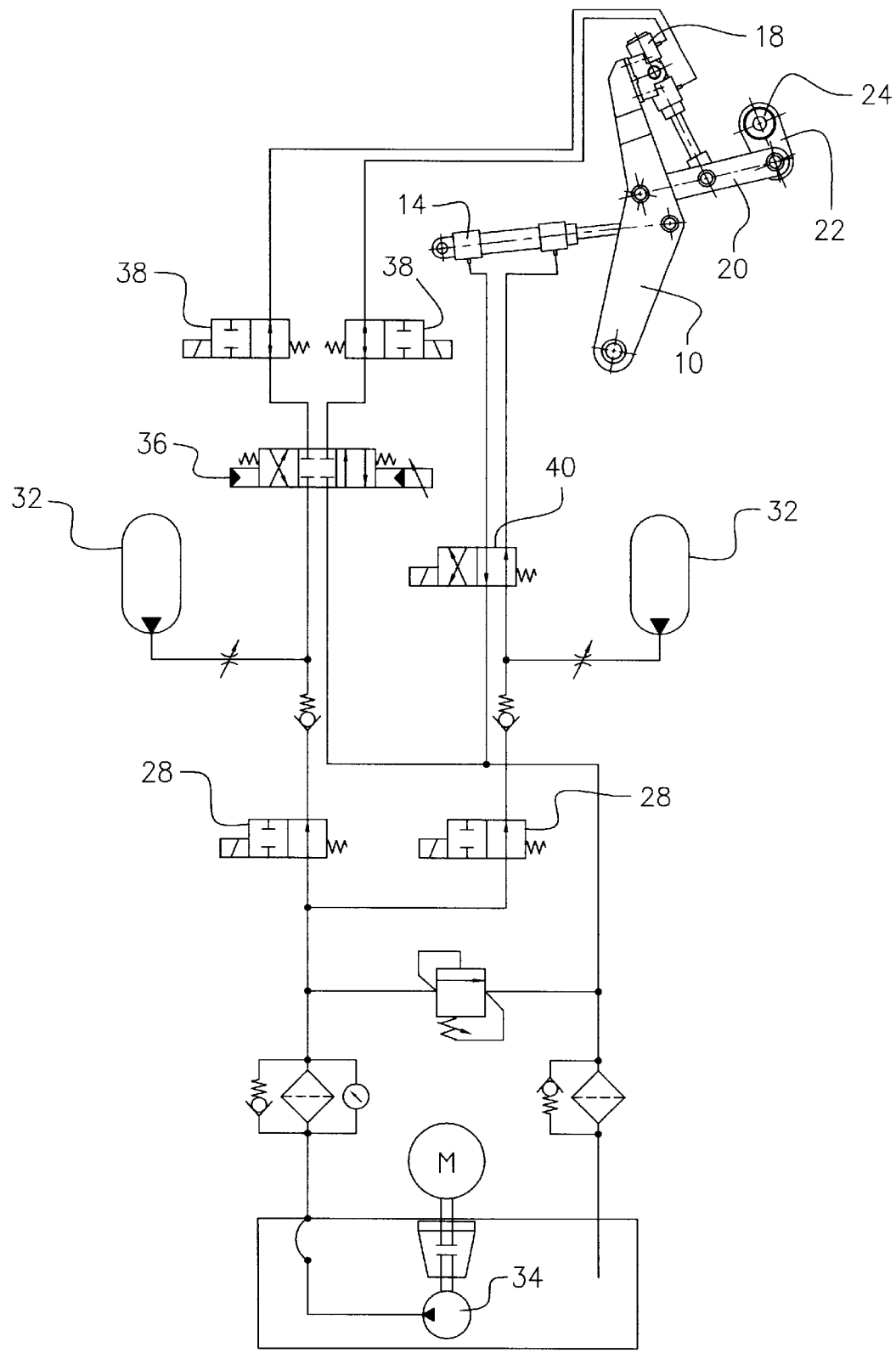
FIG. 7 shows the hydraulic circuit diagram in diagrammatic form.

The hydraulic circuit shown in FIG. 7 makes it possible to associate independent pressure storage systems with the disconnection and regulating cylinders, so that pressure losses by leaks and line breaks in one of the circuits do not impair the function of the other circuit. This ensures that if one circuit fails, the rotor blade can still be adjusted to an uncritical blade angle for the safety of the system, as a result of the separate hydraulic operation and the selected geometry of the operating linkage. This is also possible in the second variant of the invention, where the regulating cylinder acts directly on the blade pivot.

The pressure supply of the regulating and disconnection cylinders shown in FIG. 7 can be separately disconnected by valves 28 in the case of a fault. These valves are constructed as 2/2-way valves. Both circuits have separate pressure storage devices 32 dimensioned in such a way that the cylinders can be completely inserted without any additional supply through the hydraulic pump 34.

The regulating cylinder is controlled by means of a proportional valve 36, which is separated from the cylinder in the central position by two 2/2-way valves 38.

The disconnection cylinder is controlled by a 4/2-way valve 40. Therefore, the adjusting cylinder can only be moved into its end position, and in the case of a failure of the supply voltage for the valve, the disconnection cylinder automatically moves into the disconnection position.

Having thus described the invention, what is claimed and desired to be secured by Letters Patent is:

1. An individual blade adjustment system located within a hub for use with wind turbines, the system comprising:
    a) at least one moveable rocker arm;
    b) first and second drive mechanisms attached to the at least one moveable rocker arm in an intersecting plane of a blade connection within the hub;
    c) a first pivotable connection for permitting the at least one moveable rocker arm to pivot in response to the first drive mechanism acting thereupon;
    d) a second pivotable connection for permitting a blade of the wind turbine to be adjusted in response to the first or second drive mechanism acting thereupon;
    e) the first drive mechanism having a first linear extension portion for acting upon the first and second pivotable connections; and
    f) the second drive mechanism having a second linear extension portion for acting upon the second pivotable connection.

2. The individual blade adjustment system of claim 1, wherein the at least one moveable rocker arm comprises a main rocker arm and a blade rocker arm connected to one another.

3. The individual blade adjustment system of claim 2, wherein a coupling rod connects the blade rocker arm to the second pivotable connection.

4. The individual blade adjustment system of claim 1, wherein the second pivotable connection is located along an end portion of the second drive mechanism.

5. The individual blade adjustment system of claim 1, wherein the first and second drive mechanisms are constructed as first and second hydraulic cylinders respectively.

6. The individual blade adjustment system of claim 5, wherein the first hydraulic cylinder is a disconnection cylinder and the second hydraulic cylinder is a regulating cylinder.

7. The individual blade adjustment system of claim 1, wherein the second drive mechanism is constructed as an electric spindle drive.

8. The individual blade adjustment system of claim 1, wherein the first linear extension portion has a longer stroke than the second linear extension portion.

9. The individual blade adjustment system of claim 1, wherein the first drive mechanism is supported at a first end portion along an inner surface of the hub.

10. The individual blade adjustment system of claim 1, wherein the first drive mechanism attaches at a second end portion to the least one moveable rocker arm at a middle portion thereof.

11. The individual blade adjustment system of claimed 1, wherein the second drive mechanism attaches to the at least one moveable rocker arm at a distal end thereof.

12. The individual blade adjustment system of claim 1, wherein the at least one moveable rocker arm attaches to a hub-side projection of an inner surface of the hub at the first pivotable connection disposed at a proximal end of the at least one moveable rocker arm.

13. The individual blade adjustment system of claim 1, wherein the second pivotable connection can be positioned within a range of a plurality of different angles of the intersecting plane in response to the least one moveable rocker arm being acted upon by the first and second drive mechanisms.

14. The individual blade adjustment system of claim 13, wherein the second pivotable connection is positioned at a ninety degree angle within the range of the plurality of different angles when both the first and second linear extension portions are in a retracted state.

15. The individual blade adjustment system of claim 13, wherein the second pivotable connection is positioned at a thirty degree angle within the range of the plurality of different angles when the second linear extension portion is in a retracted state and the first linear extension portion is in an at least partially extended state.

16. The individual blade adjustment system of claim 13, wherein the second pivotable connection is positioned at a zero degree angle within the range of the plurality of different angles when both the first and second linear extension portions are in an at least partially extended state.

17. The individual blade adjustment system of claim 1, wherein an electronic circuit is employed to operate the first and second drive mechanisms.

18. The individual blade adjustment system of claim 17, wherein two separate hydraulic circuits are employed within the electronic circuit, each separate hydraulic circuit having a pressure storage device which can be separately disconnected by its own 2/2-way valve.

19. The individual blade adjustment system of claim 17, wherein the first drive mechanism is controlled by a 4/2-way valve of the electronic circuit.

* * * * *